April 15, 1930.  G. PASCUCCI  1,754,399
UTILIZATION OF THE FORCE OF GRAVITY AND RELATIVE APPARATUS
Filed Nov. 23, 1926  4 Sheets-Sheet 1

Inventor
GIUSEPPE PASCUCCI
By
Attorney

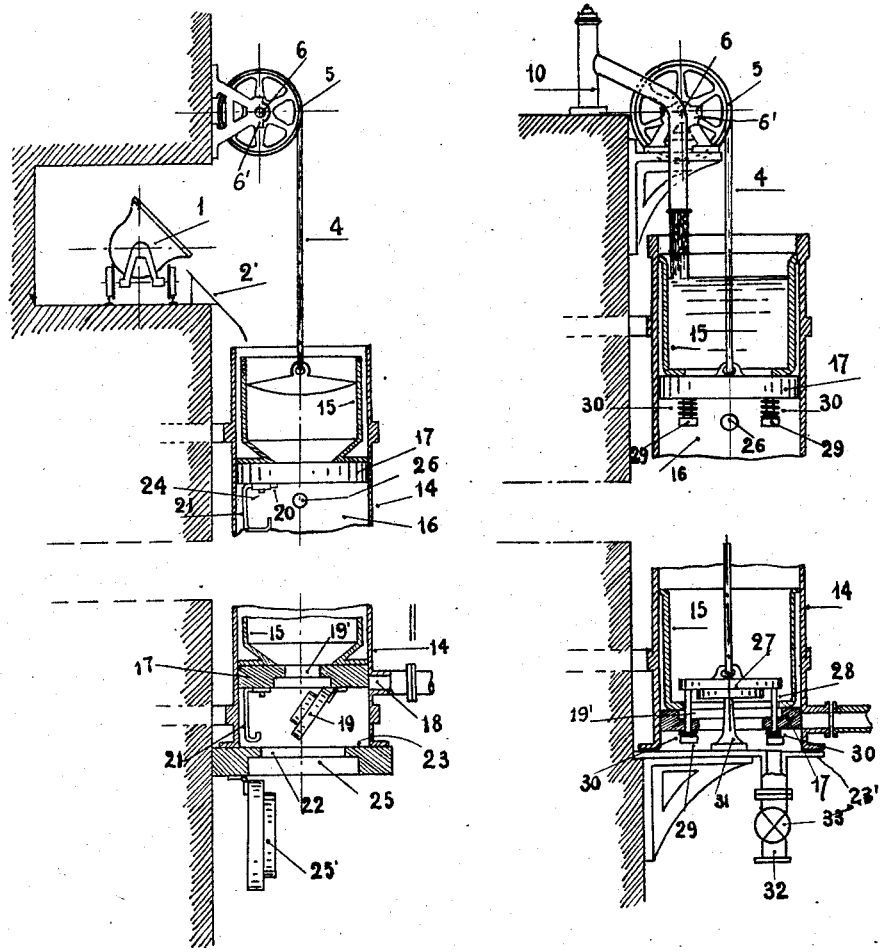

April 15, 1930.  G. PASCUCCI  1,754,399
UTILIZATION OF THE FORCE OF GRAVITY AND RELATIVE APPARATUS
Filed Nov. 23, 1926  4 Sheets-Sheet 3

Inventor
GIUSEPPE PASCUCCI

By
Attorney

April 15, 1930. G. PASCUCCI 1,754,399
UTILIZATION OF THE FORCE OF GRAVITY AND RELATIVE APPARATUS
Filed Nov. 23, 1926 4 Sheets-Sheet 4

Inventor
GIUSEPPE PASCUCCI
By
Attorney

Patented Apr. 15, 1930

1,754,399

UNITED STATES PATENT OFFICE

GIUSEPPE PASCUCCI, OF GENOA, ITALY

UTILIZATION OF THE FORCE OF GRAVITY AND RELATIVE APPARATUS

Application filed November 23, 1926, Serial No. 150,335, and in Italy January 20, 1926.

This invention relates to the utilization of the forces of gravity for the production of motive power and more particularly to an apparatus adapted to transform potential static energy into kinetic energy and potential dynamic energy.

The principal object of this inventon is the provision of a novel apparatus for transforming energy Other objects of the invention are the provision of (1) an apparatus for transforming the potential static energy of a solid mass into kinetic and potential dynamic energy, (2) an apparatus for transforming the potential static energy of a liquid mass into kinetic and potential dynamic energy, (3) an apparatus for transforming the potential static energy of a solid or liquid mass into kinetic and potential dynamic energy through the medium of a fluid, (4) a funnel-shaped hopper to increase the efficiency of the above mentioned apparatus and (5) an apparatus of the type described for raising water from a sea, lake or river. Still other objects of the invention which are inherent therein will be obvious from the following description.

These objects may be realized by the use of my apparatus which comprises generally a pulley supporting a mass composed of a container and its contents. The action of gravity upon the mass will cause it to fall and develop useful energy at the axle of the pulley. The container is then emptied and returned to its original position, refilled and the cycle repeated.

The accompanying drawings illustrate various modifications of my invention in which similar reference characters designate similar parts and wherein:

Figure 1 is an elevation of an apparatus according to the present invention, also showing the bucket container in discharging position.

Figures 2, 3, 4 and 5 are elevations, partly in vertical section, of modifications of the apparatus shown in Figure 1.

Figures 1, 2:
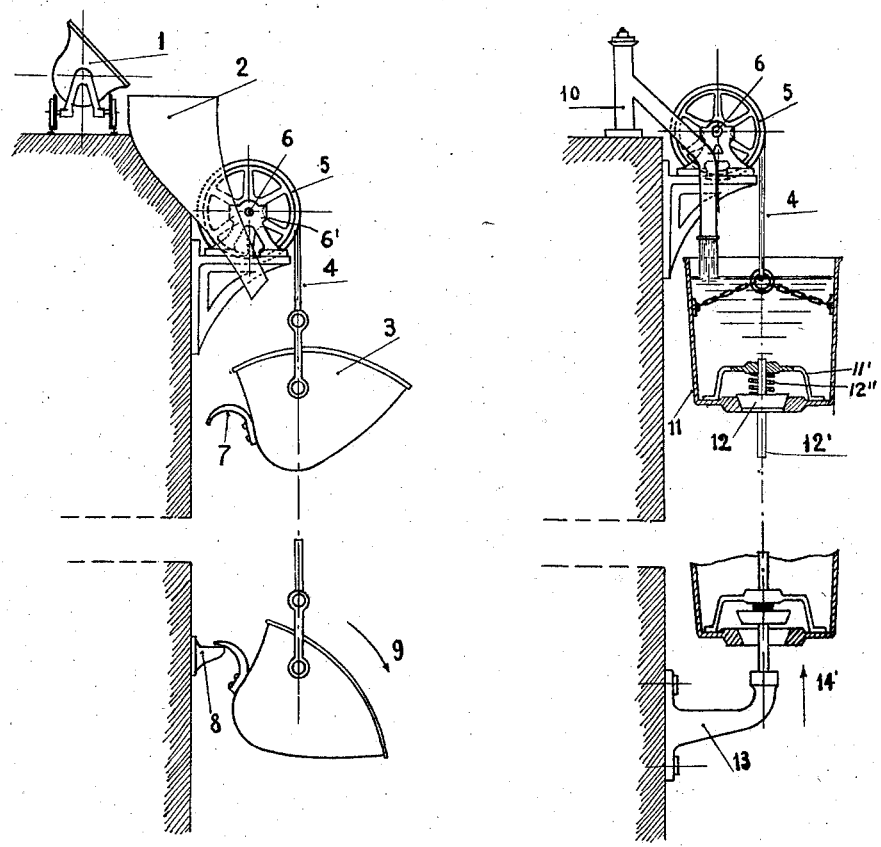

The simplest form of my invention (see Figure 1) has a dump cart 1 positioned above a loading hopper 2, conducting the weighting material into the bucket container 3. The bucket container 3 is suspended by means of a cable 4 which is wound on a pulley 5, said pulley having an axle 6 which is rotatably supported in fixed bearings 6'. The bucket container 3 has integral therewith a hook 7 which engages a stop 8 to dump the bucket container in the direction of arrow 9 when the same has descended vertically a predetermined distance. The cable 4 is attached to the bucket container 3 at points above the center of gravity thereof so that there will be no tendency to overturn the same during filling.

The potential static energy so transformed into kinetic energy may be accumulated as potential dynamic energy and a part thereof used to raise the bucket container 3 to its filling position by any convenient means. This construction is especially adaptable to the use of a solid weighting material, such as dirt, stones, etc.

The apparatus of the invention is adaptable to the use of water as a weighting materal (see Figure 2) by having a source of water supply 10 fill a container 11 which is supported at points above its center of gravity by means of a cable 4, which is wound on a pulley 5 having an axle 6 supported in suitable bearing 6'. Container 11 has positioned in the bottom thereof a valve 12 which has a rod 12' extending therethrough and is guided by an arbor 11' integral with the bottom of container 11. A stop 13 is positioned so that it engages rod 12' and opens the valve 12 in the direction of the arrow 14' against the action of a spring 12'' which encircles rod 12' between valve 12 and arbor 11', thereby effecting the discharge of the water from container 11.

The energy developed by the descent of container 11 may be accumulated, as before, and a part thereof used for the elevation of the empty container to the filling position.

The construction of Figure 1 may be modified as shown in Figure 3 so that the weighting material acts to compress a fluid, air or water, in a cylinder. The dump cart 1 discharges the weighting material onto a chute 2' which guides the same into bucket container 15. A cylinder 14 is positioned below chute 2' and is closed by a bottom 23. Within cylinder 14 is a piston 17 which has affixed thereon said bucket container 15 which is also attached to a cable 4, which is wound upon a pulley 5 having an axle 6 rotating in a set of bearings.

Cylinder 14 is also provided with an inlet pipe 26 allowing the entrance of fluid into the space 16 of the cylinder when the piston 17 is in raised position and bucket container 15 is in filling position. Piston 17 is provided with a port 19' fitted with a flap valve 19 kept in its closed position by a suitable latch 20 but which may be unlatched by an extending arm 21 which is such that when it comes into contact with an inclined stop 21' (see Fig. 6) on the bottom 23 of the cylinder, it will rotate and unlatch the valve 19. The weight of the material in the bucket will open the valve, permitting unloading of the same. Cylinder 14 is provided near its lower end with an outlet pipe 18 which may be provided with a non-return valve, and the length of arm 21 is such that outlet pipe 18 is closed when flap valve 19 is opened.

The bottom 23 of the cylinder is also provided with an opening 25 and a flap valve 25', which is adapted to open and close simultaneously with flap valve 19 by any convenient means. Flap valve 19 is positively maintained in close position by means of a latch 20 (see Fig. 3) pivotally mounted at 24. Latch 20 is integral with arm 21 which is rotated about the point 24 and is disengaged when piston 17 reaches its lower position. Flap valve 19 is then opened because of the weight of the material above it. Arm 21 engages an inclined stop 21' (see Fig. 6) to cause rotation thereof when piston 17 descends.

After the discharge of the weighting material the piston 17 will be raised and arm 21 will return to normal position thereby locking the flap valves 19 and 25' in closed position.

The apparatus of Figure 3 may be modified to adapt it to the use of a low density liquid as the weighting material (see Figure 4). The cylinder 14 has the inlet pipe 26 and outlet pipe 18, opened and closed depending on the position of piston 17, and also a second outlet pipe 32 with a control valve 33 positioned in the bottom 23' thereof. Said valve 33 may be operated manually or automatically by means actuated by the piston 17. Because of the low viscosity of the weighting material a valve 27 is used to close the port 19' in piston 17, this valve is guided vertically by means of a plurality of stems 28 integral therewith and passing through the piston 17. Suitable springs 30 surround stems 28 and are retained in position by heads 29 on the ends of said stems 28. A stop post 31 positioned on the bottom of the cylinder abuts valve 27 when piston 17 is lowered.

The cable 4, which is wound on pulley 5, is attached to the top of said valve 27. Filling the bucket container 15 will cause piston 17 to descend, thereby compressing the fluid in space 16 and forcing it through pipe 18. As the piston 17 approaches the bottom 23' of the cylinder, stop post 31 will abut valve 27, overcome the resiliency of springs 30 and raise valve 27, thereby allowing the low viscosity weighting material to discharge through port 19', valve 33 and pipe 32. Piston 17 and bucket container 15 are raised to filling position in the manner described in connection with Figure 3.

Figure 5:
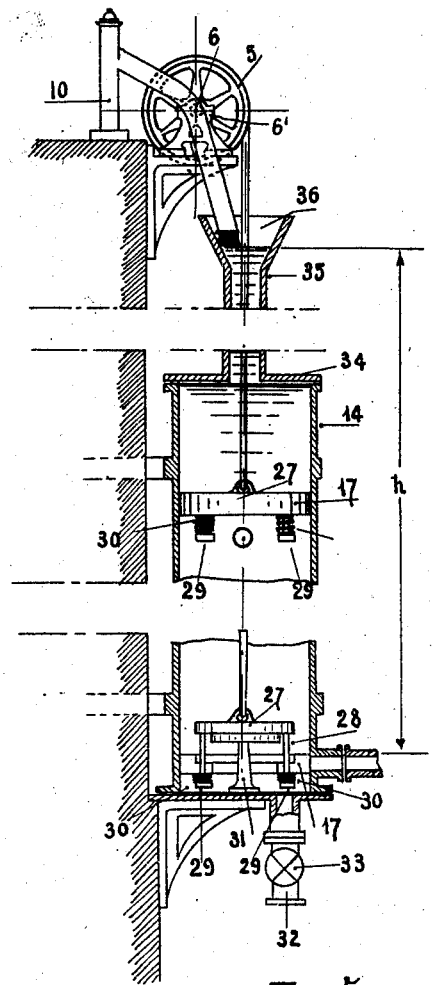

Figure 5 shows a construction somewhat similar to that of Figure 4 adapted to be used when it is necessary to obtain a higher liquid pressure on piston 17. To this end the bucket container 15 is dispensed with and the space over piston 17 is filled with the weighting material. A cover 34 on cylinder 14 supports a pipe 35 having a funnel-shaped upper end 36, the arrangement being such that the pressure of liquid on the piston is increased as indicated by the line $h$.

Figure 6:
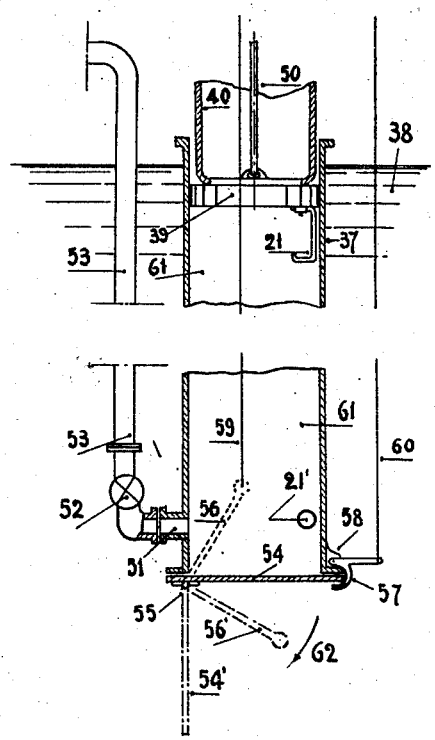
Figure 6 is an elevation, showing the construction modified to adapt it to elevating water from the sea, river or other source.

In Figure 6 a modification is shown which is especially adaptable to raising water from a sea, lake, river, etc., for irrigation or other purposes. A cylinder 37, suitably suspended in the water 38 by means not illustrated, is provided with a piston 39 of the type illustrated in Figure 3, and has pivoted on the bottom thereof an arm 21, which will release the valve in said piston 39 when said arm 21 engages a stop 21' attached to the cylinder. A bucket 40 is disposed on top of piston 39, and has the cable 50 attached thereto. Cable 50 is wound on pulley 5 in the manner previously described.

Near the bottom of the cylinder is a pipe connection 51 to which is attached a non-return valve 52 which communicates with a riser 53. The bottom 54 of the cylinder is hinged at 55 and is provided with a rigid arm 56 to which a cable 59 is connected. A hooked catch 57, hinged at 58 and normally retained in the position shown by a spring, not illustrated, has attached thereto a cable 60 which, when pulled, releases the catch and permits the door 54 to open. The space 61 being filled with water 38, the bottom 54 is then closed and valve 52 opened. The bucket container 40 is now filled with a weighting material and piston 39 is caused to descend thereby forcing the water contained in space 61 to ascend the pipe 53.

The valve in the piston will be opened as above described by means of engagement of arm 31 with a stop 21'. The hooked catch 57 will then be rotated by means of cable 60 so that the bottom 54 will be opened in the direction of arrow 62 by the weight of the mass in cylinder 40 which will be discharged therethrough. The bottom 54 and the arm 56 take the positions shown in broken lines at 54' and 56' respectively. Immediately after the discharge of the weighting material the valve in piston 39 will be closed and the hooked catch 57 will return to its closing position, the tension on cable 60 having been released, to retain the bottom 54 closed. Bottom 54 is brought to its closed position by means of tension on cable 59 raising arm 56. The bucket 40 and piston 39 are now raised to the filling position, the weighting material will again enter bucket 40 and the cycle will be repeated.

Figure 7:
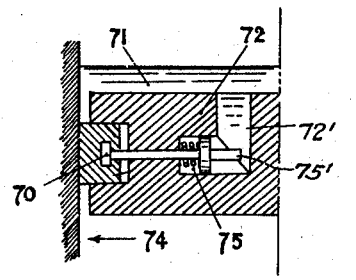
Figures 7 and 8 are vertical sections showing the operation of a detail of the apparatus.

It is extremely desirable in devices which rely upon the action of a piston, to provide a means which will cause said piston to fit as tightly as possible against the walls of the cylinder. It is also desirable to relieve the pressure between the piston and the cylinder wall during the return stroke of said piston in order to reduce the friction losses to a minimum. To this end the piston illustrated in the aforementioned devices is provided with an elastic piston ring 70 (see Figure 7) contained within a groove on the periphery of the piston 72. Said piston is further provided with a right angle channel 72' the horizontal leg of which contains a spring 75 acting on a plunger 75' which engages piston ring 70.

The above mentioned objects, namely a tight fit on the down stroke and loose fit on the up stroke, will be obtained by such an arrangement inasmuch as the fluid which is above piston 72 causing the down stroke thereof will also exert a pressure on plunger 75' overcoming the action of spring 75 forcing piston ring 70 to make a tight fit with the cylinder wall. Since the fluid above piston 72 is discharged at the end of the down stroke the pressure on plunger 75' will be removed and spring 75 will act to retract piston ring 70 to reduce to a minimum the friction with the wall of cylinder 14 during the up stroke.

Figure 8:
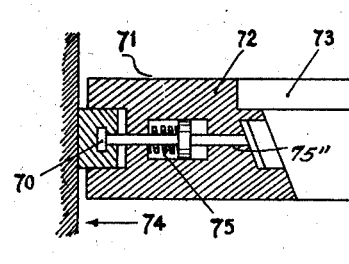

When the weighting material lacks sufficient flowing properties this device for affording a tight fit of piston ring 70 must be modified (see Figure 8). In this modification piston ring 70 is disposed in a groove on the periphery of piston 72 above which there is a solid or highly viscous material as at 71. Since the transmission of pressure through the fluid will not be as efficient the resilient spring 75 retracting plunger 75'' must be actuated by means of valve 73. Hence when valve 73 is in closed position during the down stroke of the piston, plunger 75'' will be forced to the left (see Figure 8) and piston ring 70 will be tightly held against the wall of cylinder 14. Upon discharge of the weighting material valve 73 will be opened and pressure on plunger 75'' will be relieved allowing spring 75 to retract said plunger and said piston ring 70 from tight engagement with the wall of the cylinder.

Figure 9:
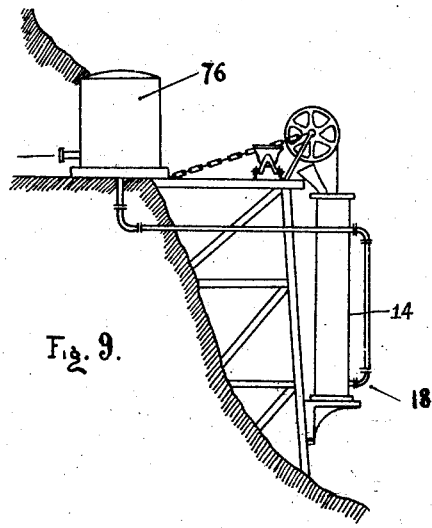
Figures 9 and 10 are elevations of installations employing the devices of the present invention.

Figure 9 illustrates schematically an installation in which the apparatus shown in Figures 3, 4 or 5 may be incorporated. In this installation the pipe 18 which leads from the lower portion of cylinder 14 is shown conducting the compressed fluid therefrom to tank 76 in which the same is stored as potential dynamic energy.

Figure 10:
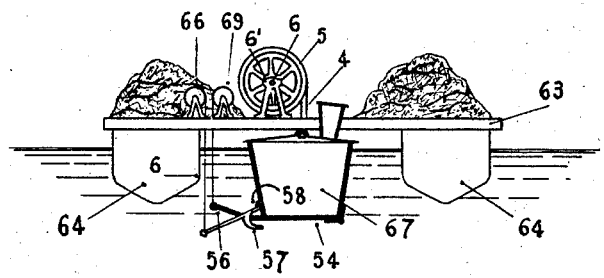

Figure 10 illustrates the manner in which a device of the character shown in Figure 1 can be adapted to use on a barge 63 which is supported by pontoons 64. In this modification the element 8 of Figure 1 is replaced by the cable 60 which is wound on a drum 66, this cable 60 will have a predetermined length depending on the vertical displacement of the bucket 67. The bottom 54 of bucket 67 is hinged thereto in a manner similar to that shown in Figure 6 and is brought into closed position by means of an arm 56 integral therewith and raised by a means of a cable 59 which is wound on a drum 69. The hinged arm 57 pivoted about point 58 engages the bottom 54 to hold the same in closed position until cable 60 becomes taught to disengage said arm 57 from the bottom. The bucket 67 is suspended as in the other modifications by means of a cable 4 which is wound up on a pulley 5 having an axle 6 which rotates in a set of fixed bearings 6'.

It is evident that numerous slight changes may be made in the general form and arrangement of the several parts herein shown and described without departing from the spirit and scope of this invention, and hence said invention is not to be construed as limited to the precise details of construction shown and described, but these illustrations are to be considered merely in an illustrative sense.

Having fully described my invention, what I claim as new, and desire to protect by Letters Patent, is:

1. An apparatus for the transformation of mechanical energy comprising a cylinder having a bottom, a cylinder discharge means in the bottom of said cylinder normally closed, a piston within said cylinder, a piston discharge means therein also normally closed, a pulley having a cable capable of being wound thereon, said cable being attached to said container to intermittently raise the same, fluid inlet means in said cylinder below said piston in raised position, compressed fluid outlet means and means for opening said piston discharge means and said cylinder discharge means when said piston is in lowermost position.

2. An apparatus for the transformation of mechanical energy comprising a cylinder having a bottom, a cylinder discharge means in the bottom of said cylinder normally closed, a cover having a funnel-shaped extension positioned on the top of said cylinder, a piston within said cylinder, a piston discharge means therein also normally closed, a pulley having a cable capable of being wound thereon, said cable being attached to said container to intermittently raise the same, fluid inlet means in said cylinder below said piston in raised position, compressed fluid outlet means and means for opening said piston discharge means and said cylinder discharge means when said piston is in lowermost position.

3. An apparatus for the transformation of mechanical energy comprising a cylinder having a bottom, a cylinder discharge means in the bottom of said cylinder normally closed, a piston within said cylinder, a piston discharge means therein also normally closed, a container positioned above said piston, a pulley having a cable wound thereon, said cable being attached to said container to intermittently raise the same, fluid inlet means in said cylinder below said piston in raised position, compressed fluid outlet, means and means for opening said piston discharge and said cylinder discharge means when said piston is in lowermost position.

4. An apparatus for the transformation of mechanical energy comprising a cylinder having a bottom, a cylinder discharge means in the bottom of said cylinder, a piston within said cylinder, a piston discharge means therein also normally closed, a rotating latch means maintaining said piston discharge means in closed position, a pulley having a cable wound thereon, said cable being attached to said container to intermittently raise the same, fluid inlet means in said cylinder below said piston in raised position, compressed fluid outlet means, disengaging means intermittently engaging said rotating latch means to unlach the same thereby opening said piston discharge means and means for opening said cylinder discharge means.

5. An apparatus for the transformation of mechanical energy comprising a cylinder having a bottom, a cylinder discharge means in the bottom of said cylinder normally closed, a piston within said cylinder, a piston discharge means therein also normally closed, a pulley having a cable wound thereon, said cable being attached to said container to intermittently raise the same, fluid inlet means in said cylinder below said piston in raised position, compressed fluid outlet means above said piston in lowermost position and means for opening said piston discharge and said cylinder discharge means when said piston is in lowermost position.

6. An apparatus for the transformation of mechanical energy comprising a cylinder having a bottom, a cylinder discharge means in the bottom of said cylinder normally closed, a piston within said cylinder, a piston discharge means therein also normally closed, a piston ring in the periphery of said piston exerting a pressure on the wall of said cylinder during descent thereof and retracted by a spring during the ascent thereof, a pulley having a cable wound thereon, said cable being attached to said container to intermittently raise the same, fluid inlet means in said cylinder below said piston in raised position, compressed fluid outlet means and means for opening said piston discharge and said cylinder discharge means when said piston is in lowermost position.

GIUSEPPE PASCUCCI.